United States Patent [19]

Lechner

[11] Patent Number: 5,138,802
[45] Date of Patent: Aug. 18, 1992

[54] DEVICE FOR FASTENING A MOUNTING FRAME FOR HYGIENIC APPARATUS

[75] Inventor: Peter Lechner, Jona, Switzerland
[73] Assignee: Geberit AG, Jona, Switzerland
[21] Appl. No.: 550,074
[22] Filed: Jul. 9, 1990

[30] Foreign Application Priority Data

Jul. 7, 1989 [CH] Switzerland .................. 2550/89

[51] Int. Cl.⁵ .............................................. E04B 1/38
[52] U.S. Cl. ........................................ 52/36; 52/235;
  52/509; 403/264; 411/511
[58] Field of Search ................. 52/506, 508, 509, 511,
  52/512, 27, 35, 36, 235, 136, 137; 248/224.3,
  224.4, 231.91; 403/104, 248, 250, 264 X

[56] References Cited

U.S. PATENT DOCUMENTS

| | | | |
|---|---|---|---|
| 4,030,261 | 6/1977 | Coleman | 52/511 |
| 4,073,107 | 2/1978 | Rousseau | 52/235 |
| 4,432,182 | 2/1984 | Addie et al. | 52/509 |
| 4,494,347 | 1/1985 | Uhlig | 52/508 |
| 4,519,173 | 5/1985 | Roberts | 52/509 |
| 4,720,952 | 1/1988 | Fricker | 52/508 |

FOREIGN PATENT DOCUMENTS

| | | | |
|---|---|---|---|
| 0916805 | 1/1963 | United Kingdom | 52/235 |
| 1417178 | 12/1975 | United Kingdom | 52/508 |
| 1440784 | 6/1976 | United Kingdom | 52/235 |

*Primary Examiner*—David A. Scherbel
*Assistant Examiner*—Robert Canfield
*Attorney, Agent, or Firm*—Pollock, Vande Sande & Priddy

[57] ABSTRACT

Device for attaching a mounting frame to a building wall. The frame has openings in its side walls into which holders (2) made of plastic stops are inserted. The holders (2) have a receiving part (2a) with two openings extending at right angles to one another and into which a connecting piece (10, 6) and a bolt (3) are slid. The connecting piece (10, 6) includes a shaft with corrugations which engage matching corrugations on the bolt (3). The connecting pieces (10, 6) can be detachably attached to a holder (2) in any insert depth without the use of tools. The device serves in particular to fasten a mounting frame during installation of a temporary wall.

6 Claims, 3 Drawing Sheets

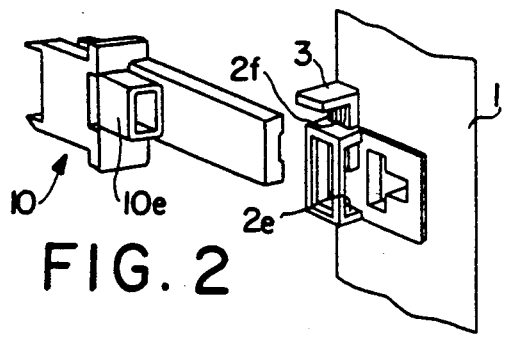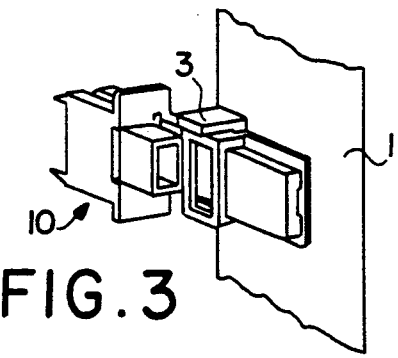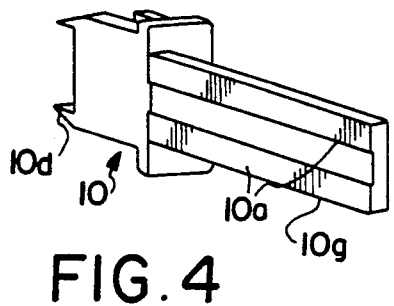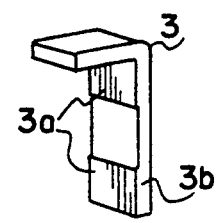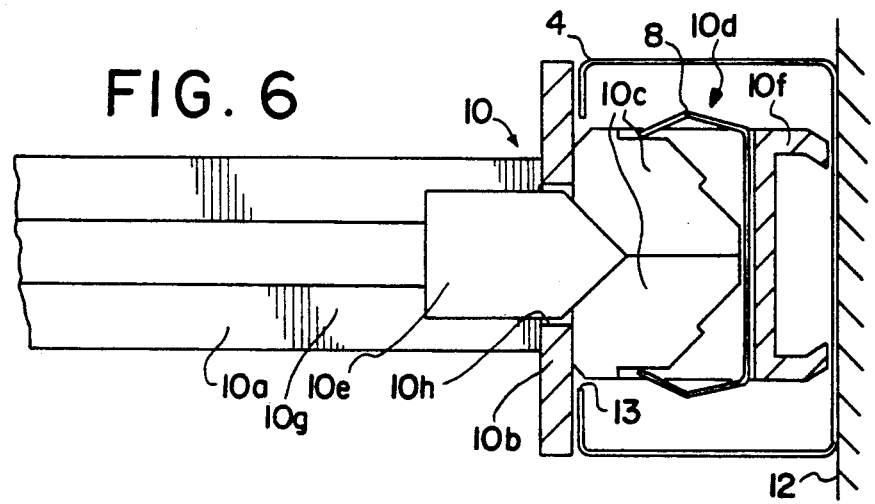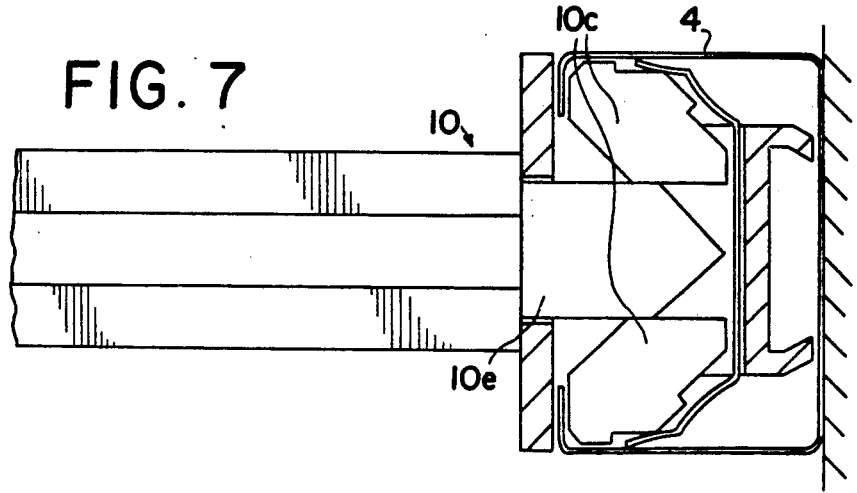

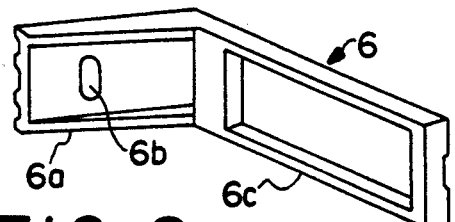
FIG. 8
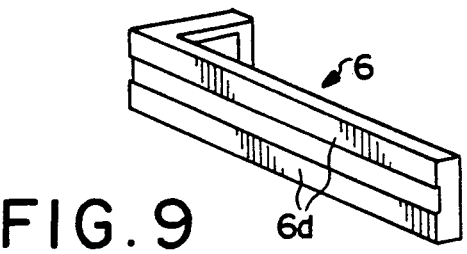
FIG. 9
FIG. 10 FIG. 11
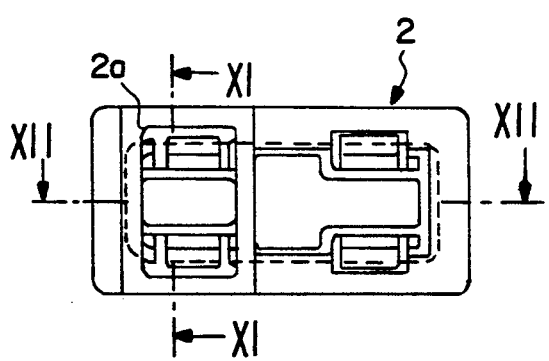 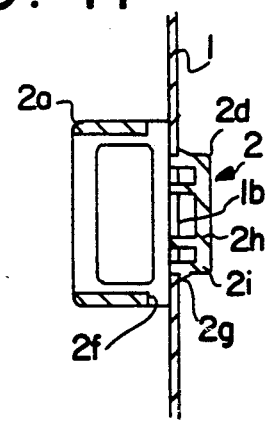
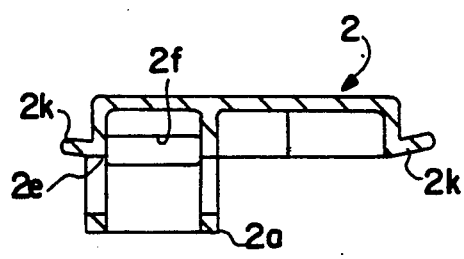
FIG. 12

DEVICE FOR FASTENING A MOUNTING FRAME FOR HYGIENIC APPARATUS

FIELD OF THE INVENTION

The invention relates to a device for fastening a mounting frame for hygienic apparatuses to a building wall.

BACKGROUND OF THE INVENTION

A device of this kind is shown in DE-A-35 28 334, and comprises a steel plate, which is fixed in position and inserted into a rail fastened to a building wall. The steel plate anchored to the rail is screwed to the mounting frame in order to fasten said mounting frame. For example, a UP toilet flush tank can be inserted into the frame. The mounting frame is suitable especially for subsequent or preliminary bricklining. For example, a wash basin or a urinal can be fastened to two threaded rods fastened to the frame.

SUMMARY OF THE INVENTION

The invention consists of a device of the aforementioned kind, which enables faster, simpler and yet stable fastening of a mounting frame to a building wall.

BRIEF DESCRIPTION OF THE DRAWINGS

The invention will be more clearly understood by reference to the accompanying drawings, in which several embodiments are shown for purposes of illustration, and in which

FIG. 2 is a perspective view of a device according to the invention prior to assembly of its parts;

FIG. 3 is a perspective view similar to FIG. 2 after assembly of the parts;

FIG. 4 is a perspective view of a connecting piece according to the invention;

FIG. 5 is a perspective view of another part of a bolt according to the invention;

FIG. 6 is a sectional view of a mounting channel, fastened to a building wall, with a device according to the invention fixed in position on said mounting channel;

FIG. 7 is a view similar to that of FIG. 6, but in locked position;

FIG. 8 is a perspective view of a further embodiment of the connecting piece according to the invention;

FIG. 9 is another view of the connecting piece of FIG. 8;

FIG. 10 is a view of a holder;

FIG. 11 is a sectional view of the holder along line XI—XI of FIG. 10; and

FIG. 12 is a sectional view of the holder along line XII—XII of FIG. 10.

DESCRIPTION OF PREFERRED EMBODIMENTS

Figure 1:
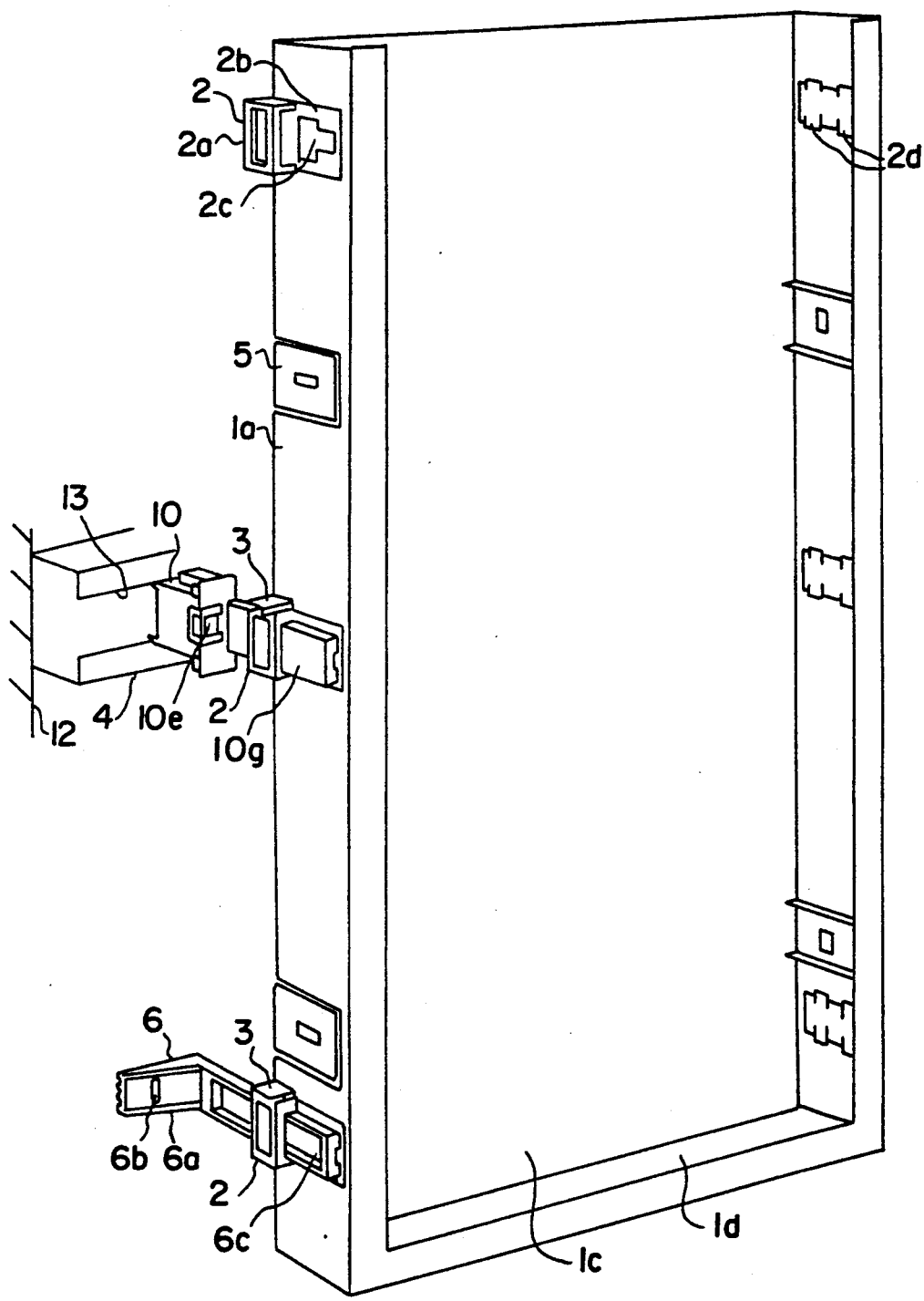
FIG. 1 is a perspective view of a mounting frame with two variants of the device according to the invention.

FIG. 1 shows a mounting frame 1 made, for example, of galvanized sheet steel, with two parallel side walls 1a, a rear wall 1c and a bottom 1d. Hygienic apparatuses, valves and fittings, pipes and conduits are attached in the conventional manner to the frame. If mounting frame 1 is fastened to a mounting channel 4 at a distance from a building wall 12, holders 2 and connecting pieces 10 are used. If, however, mounting device 1 is to be fastened directly to wall 12 of the building without mounting channels 4, holders 2 and connecting pieces 6 are more suitable. If mounting frame 1 can be fastened to building wall 12 without any intervening space, punched clips 5 are bent outwardly by 90° and fastened to the wall by suitable attachment means.

Holders 2 are made of a suitable plastic and are fastened to an opening 1b of a side 1a, as shown in FIG. 11. On flexible flanks 2i of a shoulder 2h, holders 2 have locking cams 2g, which reach behind opening 1b. To fasten one holder 2 to the mounting frame 1, only shoulder 2b need be inserted into opening 1b, whereupon locking cams 2g lock automatically and fix holder 2 unmovably in position on the mounting frame. As shown in FIG. 12, the holders have rims 2k which abut elastically the outer opening of wall 1b.

A receiving part 2a, which has a horizontally extending opening 2e and a vertically extending opening 2f, is molded to holder 2. A connecting piece 10 or a connecting piece 6 is inserted into opening 2e. To fix connecting pieces 10 or 6 in position, a bolt 3 shown in FIG. 5 is slid from above into the vertically extending opening 2f. In the mounting frame shown in FIG. 1, three identical holders 2 are fastened on each side wall, but designs in which one holder 2 on each side wall 1 suffices are also possible.

The connecting piece 10 can be also be made largely of plastic and has a rod-shaped shaft 10g, which, as shown in FIGS. 2 and 3, is slid into opening 2e of the holder. Before connecting piece 10 is slid in, a shaft 3b of bolt 3 is slid partially into opening 2f of holder 2. After connecting piece 10 has been slid into opening 2e, bolt 3 is moved downward in holder 2, causing corrugations 3a and 10h on bolt 3 or on connecting piece 10 to interengage. As will be apparent, connecting piece 10 can be detachably fixed in position at any desired slide-in depth on holder 2 substantially continuously. Correspondingly, the desired distance between the mounting frame and building wall 12 can be adjusting and fixed. To fasten connecting piece 10 to a mounting channel 4 whose cross-section is C-shaped, a holding member 10b shown in detail in FIGS. 6 and 7 is arranged on shaft 10g. This holding member has a collar 10b which externally abuts channel 4. Collar 10b has a projection 10f which is molded on said collar and is inserted into channel 4, and in which are housed two locking elements 10c held together by a flexible metal clamp. To fix connecting piece 10 in position on the channel 4 with a wedge-shaped piece 10e, these locking elements are moved into the spread position shown in FIG. 7. In addition, piece 10e is pushed through opening 10h in collar 10b and through slot 13 of channel 4 into projection 10f. Locking elements 10c are offset transversely to the longitudinal direction of channel 4 against the force of clamp 8, and lock connecting piece 10 in channel 4. Thus, connecting piece 10 can be fixed in position at any arbitrary point of channel 4 without tools. Stable fastening of connecting piece 10 on channel 4 is achieved by laterally bracing locking elements 10c and projection 10f at the interior of channel 4.

If the mounting frame is fastened without mounting channel 4 but at a distance from the building wall 12, the angular connecting pieces 6 shown in FIGS. 8 and 9 are inserted into holders 2. These parts 6 have a shaft 6c with corrugations 6d which correspond to corrugations 10a of connecting piece 10. Thus, connecting pieces 6 can also be slid into holders 2 and fixed in position with bolts 3 at the desired insert depth. An arm 6a which projects at right angles and has an opening 6 is molded to shaft 6c. To fasten connecting piece 6 to building wall 12, a suitable pin or bolt is inserted into building wall 12 through opening 6b. Connecting piece 6 is also preferably made of plastic.

What is claimed is:

1. Device for fastening a mounting frame to a building wall, said device comprising
   (a) at least one holder attached to said mounting frame;
   (b) a connecting piece to be fastened to said building wall and adapted to be inserted into said at least one holder; and
   (c) means for fixing said connecting piece in position and comprising a bolt for locking said connecting piece detachably at different depths, said bolt being provided with corrugations which engage with corresponding corrugations on said connecting piece in order to fix relative positions of said bolt and said connecting piece;
   (d) said holder comprising a receiving element projecting laterally from said mounting frame and having a first opening receiving a shaft of said connecting piece; and
   (r) said holder comprising a second opening extending transversely to said first opening and receiving said bolt transversely to a longitudinal direction of said shaft of said connecting piece.

2. Device according to claim 1 wherein said mounting frame has a side wall with at least one opening, said at least one holder being lockingly inserted into said at least one opening in said side wall.

3. Device according to claim 1, wherein said connecting piece has an angular shape and is adapted to be fastened directly to said building wall.

4. Device according to claim 1, comprising a mounting channel fastened to said building wall, said connecting piece comprising a retaining member with which said connecting piece can be fixed in position in said mounting channel.

5. Device according to claim 4, wherein said retaining member has a wedge adapted to be slid between two locking elements so as to move said locking elements apart transversely to a longitudinal direction of said mounting channel.

6. Device according to claim 5, wherein said holding member comprises a clamp which elastically fixes said two locking elements in position.

* * * * *